United States Patent
Akhavan Fomani

(10) Patent No.: US 11,340,743 B2
(45) Date of Patent: May 24, 2022

(54) TOUCH SENSOR WITH REFINED CORNER, EDGE, AND OTHER STRUCTURES

(71) Applicant: Apple Inc., Cupertino, CA (US)

(72) Inventor: Arash Akhavan Fomani, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/818,971

(22) Filed: Mar. 13, 2020

(65) Prior Publication Data

US 2020/0310595 A1 Oct. 1, 2020
US 2021/0271346 A9 Sep. 2, 2021

Related U.S. Application Data

(60) Provisional application No. 62/826,733, filed on Mar. 29, 2019.

(51) Int. Cl.
*G06F 3/044* (2006.01)
*G06F 3/041* (2006.01)

(52) U.S. Cl.
CPC .......... *G06F 3/0446* (2019.05); *G06F 3/0444* (2019.05); *G06F 3/04142* (2019.05); *G06F 2203/04103* (2013.01)

(58) Field of Classification Search
CPC combination set(s) only.
See application file for complete search history.

(56) References Cited

U.S. PATENT DOCUMENTS

| | | | |
|---|---|---|---|
| 7,289,111 B2 | 10/2007 | Asbill | |
| 10,845,902 B2* | 11/2020 | Clark | G06F 3/0443 |
| 2013/0207911 A1* | 8/2013 | Barton | G06F 3/044 |
| | | | 345/173 |
| 2014/0152579 A1* | 6/2014 | Frey | G06F 3/0445 |
| | | | 345/173 |
| 2017/0205957 A1* | 7/2017 | Park | G06F 3/0443 |
| 2017/0315640 A1 | 11/2017 | Nelson et al. | |

FOREIGN PATENT DOCUMENTS

WO 2015/189128 A1 12/2015

OTHER PUBLICATIONS

WO2015189128 Dec. 17, 2015 Gradl, Markus (Year: 2015).*

* cited by examiner

*Primary Examiner* — Van N Chow
(74) *Attorney, Agent, or Firm* — Kubota & Basol LLP

(57) ABSTRACT

A touch panel includes an array of touch electrode cells, each touch electrode cell including portions of a plurality of touch electrodes, such as portions of intersecting row and column touch electrodes that include a patterned conductive material. In some examples, the area of patterned conductive material per unit area can be different for different touch electrode cells of the touch panel. For example, the touch panel can include touch electrode cells with increased pattern densities at locations where the overall area of the touch electrode cell may be less than the overall area of other touch electrode cells in the touch panel, such as at corners, notches, perforations, and/or edges of the touch panel.

19 Claims, 12 Drawing Sheets

TOUCH SENSOR WITH REFINED CORNER, EDGE, AND OTHER STRUCTURES

CROSS-REFERENCE TO RELATED APPLICATION

This application claims the benefit of U.S. Provisional Application No. 62/826,733, filed Mar. 29, 2019, which is hereby incorporated by reference in its entirety for all purposes.

FIELD

This relates to a touch panel and, more particularly, to a touch panel that includes touch electrode cells having varying pattern densities at different locations on the touch panel.

BACKGROUND

Many types of input devices are presently available for performing operations in a computing system, such as buttons or keys, mice, trackballs, joysticks, touch panels, touch screens and the like. Touch screens, in particular, are popular because of their ease and versatility of operation as well as their declining price. Touch screens can include a touch panel, which can be a clear panel with a touch-sensitive surface, and a display device such as a liquid crystal display (LCD), light emitting diode (LED) display or organic light emitting diode (OLED) display that can be positioned partially or fully behind the panel so that the touch-sensitive surface can cover at least a portion of the viewable area of the display device. Touch screens can allow a user to perform various functions by touching the touch panel using a finger, stylus or other object at a location often dictated by a user interface (UI) being displayed by the display device. In general, touch screens can recognize a touch and the position of the touch on the touch panel, and the computing system can then interpret the touch in accordance with the display appearing at the time of the touch, and thereafter can perform one or more actions based on the touch. In some examples, touch panels can be included in other input devices that are separate from any display screen, such as trackpads. In the case of some touch sensing systems, a physical touch on the display is not needed to detect a touch. For example, in some capacitive-type touch sensing systems, fringing electrical fields used to detect touch can extend beyond the surface of the display, and objects approaching near the surface may be detected near the surface without actually touching the surface.

Capacitive touch panels can be formed by a matrix of partially or fully transparent or non-transparent conductive plates (e.g., touch electrodes) made of materials such as Indium Tin Oxide (ITO). In some examples, the conductive plates can be formed from other materials including conductive polymers, metal mesh, graphene, nanowires (e.g., silver nanowires) or nanotubes (e.g., carbon nanotubes). It is due in part to their substantial transparency that some capacitive touch panels can be overlaid on a display to form a touch screen, as described above. Some touch screens can be formed by at least partially integrating touch sensing circuitry into a display pixel stackup (i.e., the stacked material layers forming the display pixels). In some examples, opaque touch panels, such as trackpads, can include opaque conductive materials, such as metallic materials including copper, silver, gold, and the like.

SUMMARY

This relates to a touch panel and, more particularly, to a touch panel that includes touch electrode cells having varying pattern densities at different locations on the touch panel. In some examples, the touch panel includes an array of touch electrode cells, each touch electrode cell including portions of a plurality of touch electrodes, such as portions of intersecting row and column touch electrodes. The touch electrodes can include a patterned conductive material in a pattern that includes connected conductive "islands" that can be shaped into rectangles, squares, circles, or other shapes.

In some examples, the touch electrode cells of the touch panel can have different pattern densities. In other words, the area of patterned conductive material per unit area can be different for different touch electrode cells of the touch panel. For example, the touch panel can include touch electrode cells with increased pattern densities at locations where the overall area of the touch electrode cell may be less than the overall area of other touch electrode cells in the touch panel, such as at corners, notches, perforations, and/or edges of the touch panel.

DETAILED DESCRIPTION

Figure 1A:
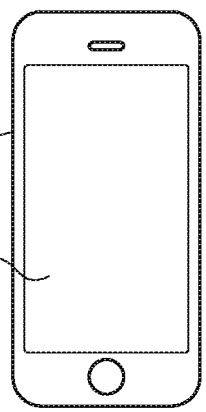
FIGS. 1A-1E illustrate example systems that can implement modified touch sensor structures according to examples of the disclosure.
Figure 1B:
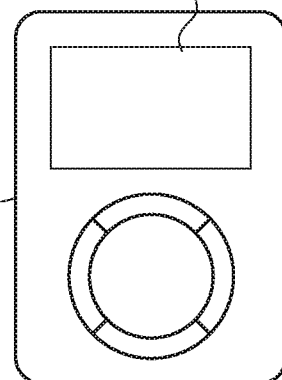
Figure 1C:
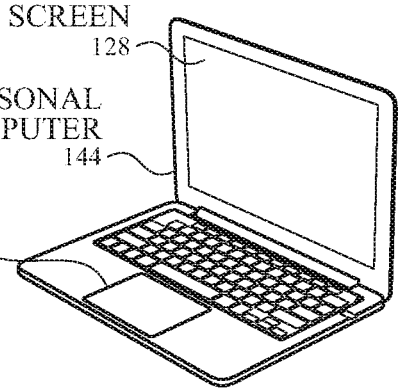
Figure 1D:
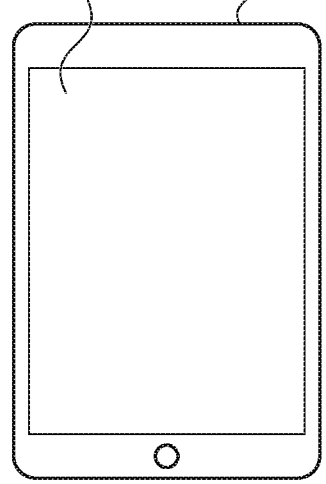
Figure 1E:
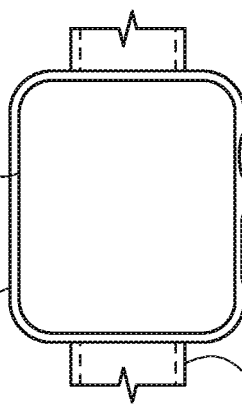

FIGS. 1A-1E illustrate example systems that can implement modified touch sensor structures according to examples of the disclosure. FIG. 1A illustrates an example mobile telephone 136 that includes a touch screen 124 that can be implemented with modified touch sensor structures according to examples of the disclosure. FIG. 1B illustrates an example digital media player 140 that includes a touch screen 126 that can be implemented with modified touch sensor structures according to examples of the disclosure. FIG. 1C illustrates an example personal computer 144 that includes a touch screen 128 and a touch panel 129 that can be implemented with modified touch sensor structures according to examples of the disclosure. FIG. 1D illustrates an example tablet computing device 148 that includes a touch screen 130 that can be implemented with modified touch sensor structures according to examples of the disclosure. FIG. 1E illustrates an example wearable device 150 that includes a touch screen 132 and can be attached to a user using a strap 152 and that can be implemented with modified touch sensor structures according to examples of the disclosure. It is understood that a touch screen or touch panel with modified touch sensor structures can be implemented in other devices as well. Additionally it should be understood that although the disclosure herein primarily focuses on touch screens, the disclosure of modified touch sensor structures can be implemented for devices including touch panels (and displays) that may not be implemented as a touch screen.

In some examples, touch screens 124, 126, 128, 130 and 132 and touch panel 129 can be sensed by detecting mutual capacitance between two or more electrodes of the touch panel or touch screen. A mutual capacitance based touch system can include electrodes arranged as drive and sense lines that may cross over each other on different layers (in a double-sided configuration), or may be adjacent to each other on the same layer. The crossing or adjacent locations can form touch nodes. During operation, the drive line can be stimulated with an AC waveform and the mutual capacitance of the touch node can be measured. As an object approaches the touch node, the mutual capacitance of the touch node can change (e.g., increase). This change in the mutual capacitance of the touch node can be detected and measured by the touch sensing system to determine the positions of multiple objects when they touch, or come in proximity to, the touch screen. As described herein, in some examples, a mutual capacitance based touch system can form touch nodes from a matrix of small, individual plates of conductive material. Additionally or alternatively, touch screens can be sensed by detecting self-capacitance of one or more electrodes included in the touch screen.

Figure 2:
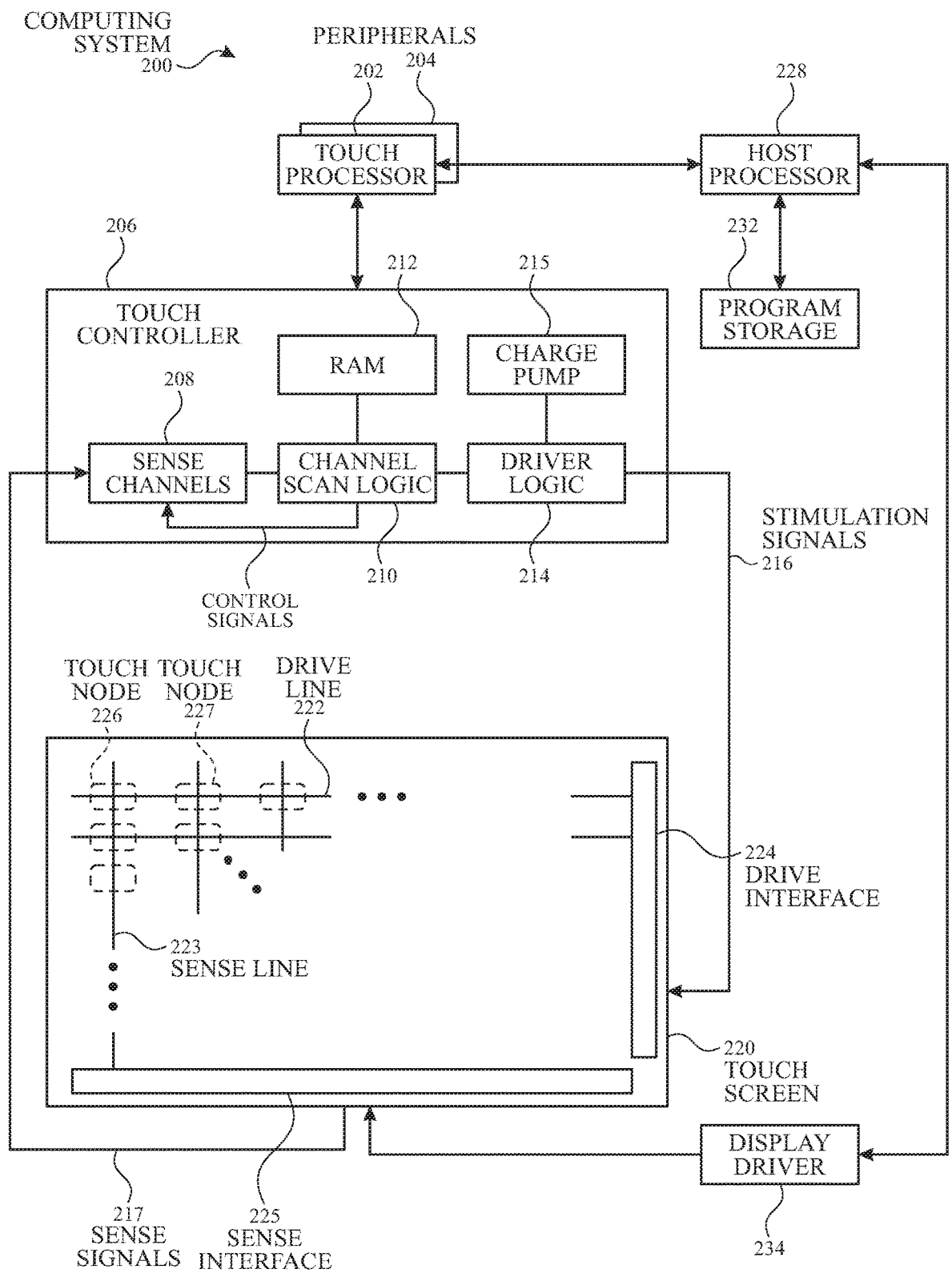
FIG. 2 illustrates an example computing system including a touch screen that can be implemented with modified touch electrode structures according to examples of the disclosure.

FIG. 2 illustrates an example computing system including a touch screen that can be implemented with modified touch electrode structures according to examples of the disclosure. Computing system 200 can be included in, for example, a mobile phone, tablet, touchpad, portable or desktop computer, portable media player, wearable device or any mobile or non-mobile computing device that includes a touch screen or touch panel. Computing system 200 can include a touch sensing system including one or more touch processors 202, peripherals 204, a touch controller 206, and touch sensing circuitry (described in more detail below). Peripherals 204 can include, but are not limited to, random access memory (RAM) or other types of memory or storage, watchdog timers and the like. Touch controller 206 can include, but is not limited to, one or more sense channels 208, channel scan logic 210 and driver logic 214. Channel scan logic 210 can access RAM 212, autonomously read data from the sense channels and provide control for the sense channels. In addition, channel scan logic 210 can control driver logic 214 to generate stimulation signals 216 at various frequencies and/or phases that can be selectively applied to drive regions of the touch sensing circuitry of touch screen 220, as described in more detail below. In some examples, touch controller 206, touch processor 202 and peripherals 204 can be integrated into a single application specific integrated circuit (ASIC), and in some examples can be integrated with touch screen 220 itself.

It should be apparent that the architecture shown in FIG. 2 is only one example architecture of computing system 200, and that the system could have more or fewer components than shown, or a different configuration of components. The various components shown in FIG. 2 can be implemented in hardware, software, firmware or any combination thereof, including one or more signal processing and/or application specific integrated circuits.

Computing system 200 can include a host processor 228 for receiving outputs from touch processor 202 and performing actions based on the outputs. For example, host processor 228 can be connected to program storage 232 and a display controller, such as a Liquid-Crystal Display (LCD) driver 234. It is understood that although the examples of the disclosure are described with reference to LCD displays, the scope of the disclosure is not so limited and can extend to other types of displays, such as Light-Emitting Diode (LED) displays, including Organic LED (OLED), Active-Matrix Organic LED (AMOLED) and Passive-Matrix Organic LED (PMOLED) displays. The LCD driver 234 can provide voltages on select (e.g., gate) lines to each pixel transistor and can provide data signals along data lines to these same transistors to control the pixel display image.

Host processor 228 can use LCD driver 234 to generate a display image on touch screen 220, such as a display image of a user interface (UI), and can use touch processor 202 and touch controller 206 to detect a touch on or near touch screen 220, such as a touch input to the displayed UI. The touch input can be used by computer programs stored in program storage 232 to perform actions that can include, but are not limited to, moving an object such as a cursor or pointer, scrolling or panning, adjusting control settings, opening a file or document, viewing a menu, making a selection, executing instructions, operating a peripheral device connected to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like. Host processor 228 can also perform additional functions that may not be related to touch processing.

In some examples, the LCD driver 234 is operatively coupled to a display system that is separate from a touch panel included in an electronic device. For example, personal computer 144 illustrated in FIG. 1C can include touch panel 129 which may not be a touch screen. Thus, in some examples, one or more touch panels included in an electronic device may not be operatively coupled to the LCD driver 234 or other display driver(s) of the electronic device.

Note that one or more of the functions described herein, including the configuration of switches, can be performed by firmware stored in memory (e.g., one of the peripherals 204 in FIG. 2) and executed by touch processor 202, or stored in program storage 232 and executed by host processor 228. The firmware can also be stored and/or transported within any non-transitory computer-readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "non-transitory computer-readable storage medium" can be any medium (excluding signals) that can contain or store the program for use by or in connection with the instruction execution system, apparatus, or device. In some examples, RAM 212 or program storage 232 (or both) can be a non-transitory computer readable storage medium. One or both of RAM 212 and program storage 232 can have stored therein instructions, which when executed by touch processor 202 or host processor 228 or both, can cause the device including computing system 200 to perform one or more functions and methods of one or more examples of this disclosure. The computer-readable storage medium can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The firmware can also be propagated within any transport medium for use by or in connection with an instruction execution system, apparatus, or device, such as a computer-based system, processor-containing system, or other system that can fetch the instructions from the instruction execution system, apparatus, or device and execute the instructions. In the context of this document, a "transport medium" can be any medium that can communicate, propagate or transport the program for use by or in connection with the instruction execution system, apparatus, or device. The transport medium can include, but is not limited to, an electronic, magnetic, optical, electromagnetic or infrared wired or wireless propagation medium.

Touch screen 220 can be used to derive touch information at multiple discrete locations of the touch screen, referred to herein as touch nodes. Touch screen 220 can include touch sensing circuitry that can include a capacitive sensing medium having a plurality of drive lines 222 and a plurality of sense lines 223. It should be noted that the term "lines" is sometimes used herein to mean simply conductive pathways, as one skilled in the art will readily understand, and is not limited to elements that are strictly linear, but includes pathways that change direction, and includes pathways of different size, shape, materials, etc. Drive lines 222 can be driven by stimulation signals 216 from driver logic 214 through a drive interface 224, and resulting sense signals 217 generated in sense lines 223 can be transmitted through a sense interface 225 to sense channels 208 in touch controller 206. In this way, drive lines and sense lines can be part of the touch sensing circuitry that can interact to form capacitive sensing nodes, which can be thought of as touch picture elements (touch pixels) and referred to herein as touch nodes, such as touch nodes 226 and 227. This way of understanding can be particularly useful when touch screen 220 is viewed as capturing an "image" of touch ("touch image"). In other words, after touch controller 206 has determined whether a touch has been detected at each touch nodes in the touch screen, the pattern of touch nodes in the touch screen at which a touch occurred can be thought of as an "image" of touch (e.g., a pattern of fingers touching the touch screen). As used herein, an electrical component "coupled to" or "connected to" another electrical component encompasses a direct or indirect connection providing electrical path for communication or operation between the coupled components. Thus, for example, drive lines 222 may be directly connected to driver logic 214 or indirectly connected to drive logic 214 via drive interface 224 and sense lines 223 may be directly connected to sense channels 208 or indirectly connected to sense channels 208 via sense interface 225. In either case an electrical path for driving and/or sensing the touch nodes can be provided.

Figure 3A:
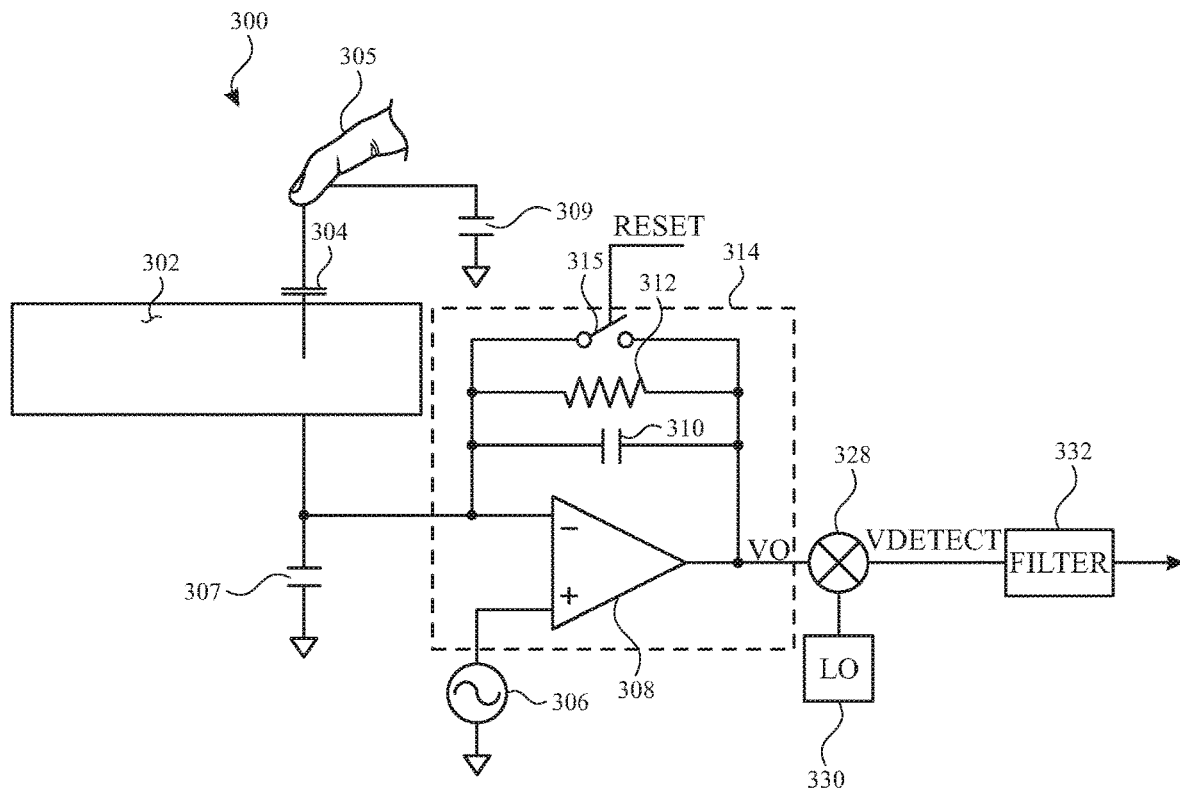
FIG. 3A illustrates an exemplary touch sensor circuit corresponding to a self-capacitance measurement of a touch node electrode and sensing circuit according to examples of the disclosure.

FIG. 3A illustrates an exemplary touch sensor circuit 300 corresponding to a self-capacitance measurement of a touch electrode 302 and sensing circuit 314 according to examples of the disclosure. Touch electrode 302 can correspond to a touch electrode 404 or 406 of touch screen 400. Touch electrode 302 can have an inherent self-capacitance to ground associated with it, and also an additional self-capacitance to ground that is formed when an object, such as finger 305, is in proximity to or touching the electrode. The total self-capacitance to ground of touch electrode 302 can be illustrated as capacitance 304. Touch electrode 302 can be coupled to sensing circuit 314. Sensing circuit 314 can include an operational amplifier 308, feedback resistor 312 and feedback capacitor 310, although other configurations can be employed. For example, feedback resistor 312 can be replaced by a switched capacitor resistor in order to minimize a parasitic capacitance effect that can be caused by a variable feedback resistor. Touch electrode 302 can be coupled to the inverting input (−) of operational amplifier 308. An AC voltage source 306 ($V_{ac}$) can be coupled to the non-inverting input (+) of operational amplifier 308. Touch sensor circuit 300 can be configured to sense changes (e.g., increases) in the total self-capacitance 304 of the touch node electrode 302 induced by a finger or object either touching or in proximity to the touch panel. Output 320 can be used by a processor to determine the presence of a proximity or touch event, or the output can be inputted into a discrete logic network to determine the presence of a proximity or touch event.

Figure 3B:
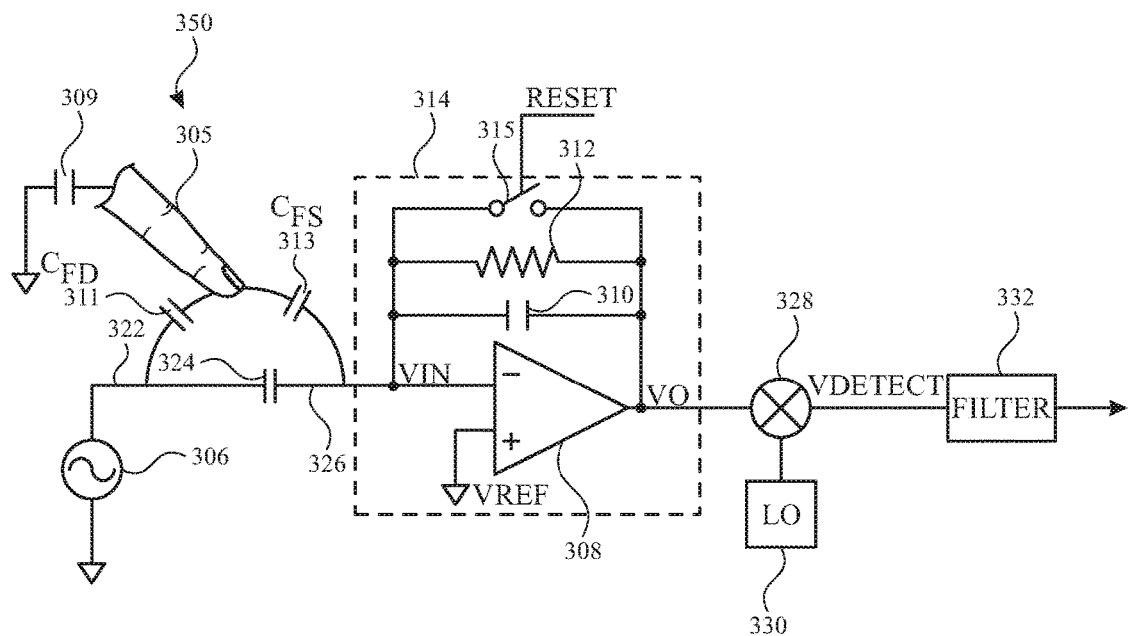
FIG. 3B illustrates an exemplary touch sensor circuit corresponding to a mutual-capacitance drive line and sense line and sensing circuit according to examples of the disclosure.

FIG. 3B illustrates an exemplary touch sensor circuit 350 corresponding to a mutual-capacitance drive line 322 and sense line 326 and sensing circuit 314 according to examples of the disclosure. Drive line 322 can be stimulated by stimulation signal 306 (e.g., an AC voltage signal). Stimulation signal 306 can be capacitively coupled to sense line 326 through mutual capacitance 324 between drive line 322 and the sense line. When a finger or object 305 approaches the touch node created by the intersection of drive line 322 and sense line 326, mutual capacitance 324 can change (e.g., decrease). This change in mutual capacitance 324 can be detected to indicate a touch or proximity event at the touch node, as described herein. The sense signal coupled onto sense line 326 can be received by sensing circuit 314. Sensing circuit 314 can include operational amplifier 308 and at least one of a feedback resistor 312 and a feedback capacitor 310. FIG. 3B illustrates a general case in which both resistive and capacitive feedback elements are utilized. The sense signal (referred to as Vin) can be inputted into the inverting input of operational amplifier 308, and the non-inverting input of the operational amplifier can be coupled to a reference voltage $V_{ref}$. Operational amplifier 308 can drive its output to voltage $V_o$ to keep $V_{in}$ substantially equal to $V_{ref}$, and can therefore maintain $V_{in}$ constant or virtually grounded. A person of skill in the art would understand that in this context, equal can include deviations of up to 15%. Therefore, the gain of sensing circuit 314 can be mostly a function of the ratio of mutual capacitance 324 and the feedback impedance, comprised of resistor 312 and/or capacitor 310. The output of sensing circuit 314 Vo can be filtered and heterodyned or homodyned by being fed into multiplier 328, where Vo can be multiplied with local oscillator 330 to produce $V_{detect}$. $V_{detect}$ can be inputted into filter 332. One skilled in the art will recognize that the placement of filter 332 can be varied; thus, the filter can be placed after multiplier 328, as illustrated, or two filters can be employed: one before the multiplier and one after the multiplier. In some examples, there can be no filter at all. The direct current (DC) portion of $V_{detect}$ can be used to determine if a touch or proximity event has occurred.

Referring back to FIG. 2, in some examples, touch screen 220 can be an integrated touch screen in which touch sensing circuit elements of the touch sensing system can be integrated into the display pixel stackups of a display. The circuit elements in touch screen 220 can include, for example, elements that can exist in LCD or other displays (LED display, OLED display, etc.), such as one or more pixel transistors (e.g., thin film transistors (TFTs)), gate lines, data lines, pixel electrodes and common electrodes. In a given display pixel, a voltage between a pixel electrode and a common electrode can control a luminance of the display pixel. The voltage on the pixel electrode can be supplied by a data line through a pixel transistor, which can be controlled by a gate line. It is noted that circuit elements are not limited to whole circuit components, such as a whole capacitor, a whole transistor, etc., but can include portions of circuitry, such as only one of the two plates of a parallel plate capacitor.

Figure 4:
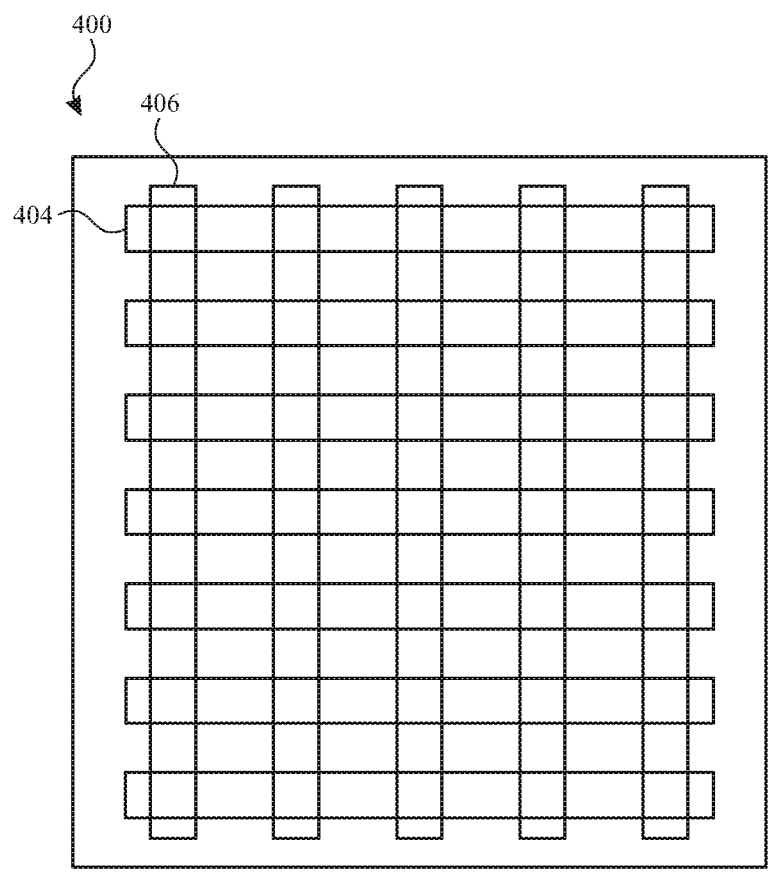
FIG. 4 illustrates touch screen with touch electrodes arranged in rows and columns according to examples of the disclosure.

FIG. 4 illustrates touch screen 400 with touch electrodes 404 and 406 arranged in rows and columns according to examples of the disclosure. Specifically, touch screen 400 can include a plurality of touch electrodes 404 disposed as rows, and a plurality of touch electrodes 406 disposed as columns. Touch electrodes 404 and touch electrodes 406 can be on the same or different material layers on touch screen 400, and can intersect with each other, as illustrated in FIG. 4. In some examples, the electrodes can be formed on opposite sides of a transparent (partially or fully) substrate and from a transparent (partially or fully) semiconductor material, such as ITO, though other materials are possible. In some examples, the electrodes can be formed from an opaque conductive material, such as metal (e.g., copper, gold, silver, etc.). Electrodes disposed on layers on different sides of the substrate can be referred to herein as a double-sided sensor. In some examples, touch screen 400 can sense the self-capacitance of touch electrodes 404 and 406 to detect touch and/or proximity activity on touch screen 400, and in some examples, touch screen 400 can sense the mutual capacitance between touch electrodes 404 and 406 to detect touch and/or proximity activity on touch screen 400.

Although the examples described above with reference to FIGS. 1-4 are related to touch screens, it should be understood that any of the principles described with reference to FIGS. 1-4 can also be applied to touch panels that are separate from any display device. For example, touch panel 129 illustrated in FIG. 1C can be a trackpad that incorporates one or more of details described with respect to FIGS. 1-4. Likewise, while the Examples of FIGS. 5-9 are described with reference to touch panels, it should be understood that the details of these systems can also be applied to touch panels that do not include displays (e.g., trackpads) as well as touch screens, which can include integrated touch screens and overlaid "on-cell" touch screens.

Figure 5A:
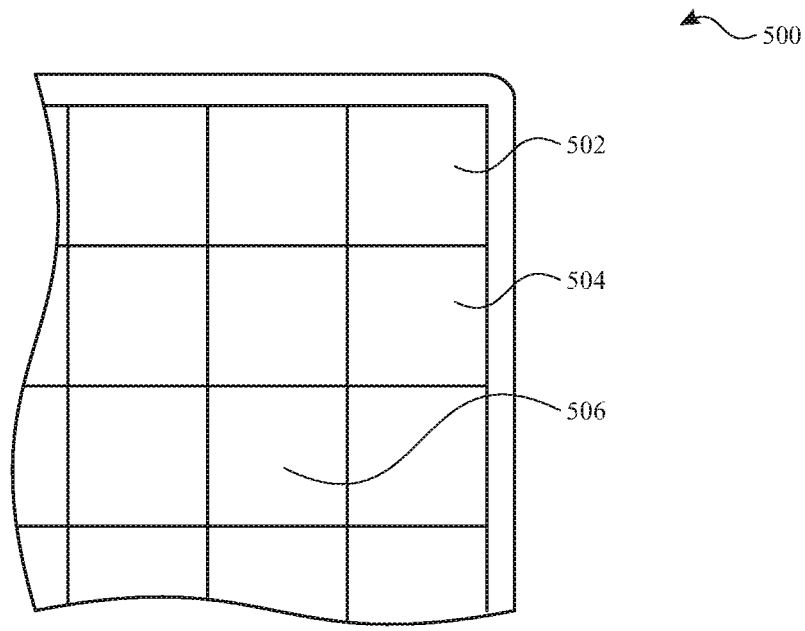
FIG. 5A illustrates a partial view of an exemplary touch panel with sharp corners according to some examples of the disclosure.

FIG. 5A illustrates a partial view of an exemplary touch panel 500 with sharp corners according to some examples of the disclosure. The touch panel 500 can include an array of touch electrode cells, including corner touch electrode cell 502, edge touch electrode cell 504, and inner touch electrode cell 506, for example.

As used herein, a "touch electrode cell" is defined as a predetermined section of a touch panel with a unique location that does not overlap with other touch electrode cells in the touch panel that includes a portion of one column electrode and a portion of one row electrode. Touch cells are bounded between adjacent rows and adjacent column or, where applicable, an edge of the touch panel. The boundary of a touch electrode cell that is defined by the boundary between two adjacent columns intersects a row included in the touch electrode cell. Likewise, the boundary of the touch electrode cell that is defined by the boundary between two adjacent rows intersects a column included in the touch electrode cell. As illustrated in FIG. 5A, a touch electrode cell that has a square shape includes the intersection of a column electrode and a row electrode in the middle of the touch electrode cell. In some examples, as will be described below, other touch electrode cell shapes are possible. Variations in touch electrode cell shape can cause the location of the intersection of the column electrode and row electrode to be at a location within the touch electrode cell other than the middle of the touch electrode cell. In single-sided touch panels (e.g., touch panels in which the row and column electrodes are on the same material layer), jumpers, traces, or vias can be used to connect disconnected segments of row electrodes or column electrodes. In multi-layer touch panels (e.g., touch panels in which the row and column electrodes are on different material layers), touch electrode cells are defined by the location on both the row electrode layer and the column electrode layer (and optionally any other layers in a touch panel stackup) bounded by the boundaries between the rows and columns adjacent to the row and column included in the touch electrode cell.

In some examples, each touch electrode cell 502-506 can include a pattern of conductive material for sensing a touch using, for example, a process similar to the touch sensing processes described above with reference to FIGS. 3A-3B. The touch electrode cells 502-506 can represent touch node electrodes similar to touch node electrode 408 illustrated in FIG. 4B, for example. In some examples, the touch electrode cells 504-506 can include segments of touch electrodes disposed as rows and segments of touch electrodes disposed as columns, such as electrodes 404 and 406, respectively, described above with reference to FIG. 4A. If the touch panel 400 includes row and column electrodes, each touch electrode cell 402-506 can include the intersection of one row and one column, thus representing a unique point on the touch panel 500.

As illustrated in FIG. 5A, in some examples, the touch panel 500 can include sharp corners. Thus, the corner touch electrode cell 502, the edge touch electrode cell 504, and the inner touch electrode cell 506 can have substantially the same areas. In some examples, touch electrode cells having substantially the same areas can have similar touch sensitivity, similar total capacitance, and similar capacitive loading. That is to say, if touch panel 500 includes touch node electrodes, the touch node electrodes in touch electrode cells 502, 504, and 506 can have similar areas and similar capacitive loading. Likewise, if touch panel 500 includes touch electrodes disposed as rows and columns, the row electrodes that are located in touch electrode cells 502, 504, and 506 can have similar areas and similar capacitive loading to one another and the column electrodes that are located in touch electrode cells 502, 504, and 506 can have similar areas and similar capacitive loading.

In some examples, it can be advantageous for the touch panel to have touch electrode cells with similar, substantially the same, or the same electrode area and capacitive loading. Reducing or eliminating variation in electrode area and capacitive loading can allow touch sensitivity to be constant or substantially constant at all locations on the touch panel and can allow the expected signal range to be constant or substantially constant for all touch electrodes, reducing the amount of signal processing needed to detect a touch from the touch data collected at the touch panel.

Figure 5B:
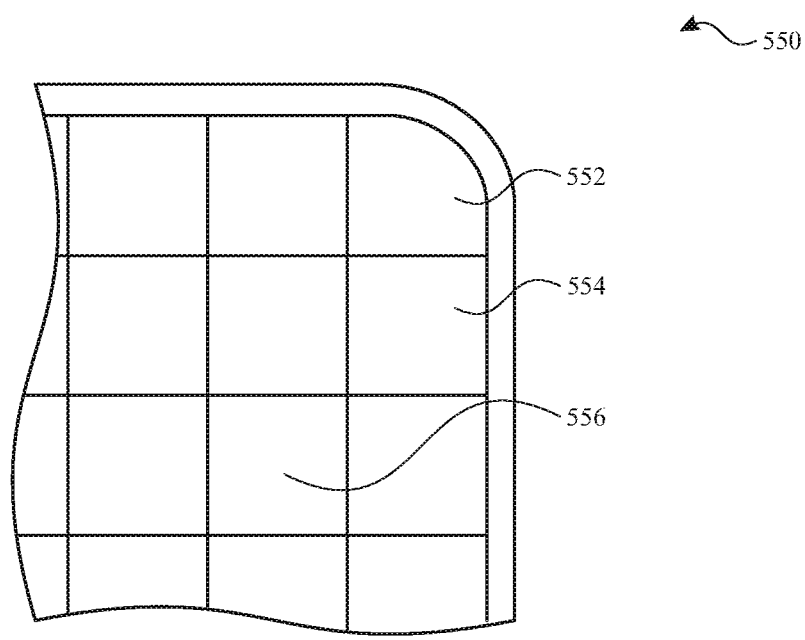
FIG. 5B illustrates a partial view of an exemplary touch panel with rounded corners according to some examples of the disclosure.

FIG. 5B illustrates a partial view of an exemplary touch panel 550 with rounded corners according to some examples of the disclosure. The touch panel 550 can include an array of touch electrode cells, including corner touch electrode cell 552, edge touch electrode cell 554, and inner touch electrode cell 556, for example.

Touch panel 550 can be similar to touch panel 500 except that corner touch electrode cell 552 can have a smaller area and a different shape than touch electrode cell 502. Shaping the corner touch electrode cell 552 in this way can allow the touch panel 500 to have rounded corners. In some examples, rounded corners can allow the touch panel to fit into a device bezel with rounded corners.

In some examples, the corner touch electrode cell 552 can have a smaller area than the area of touch electrode cell 552 and touch electrode cell 556. Because of the advantages of reducing variation in capacitive loading of touch electrodes included in touch panels, such as touch panel 500 or touch panel 550, it can be desirable to increase the sensitivity and/or capacitive loading of the corner touch electrode cell 552 and, more generally, of touch electrode cells that have reduced area. Examples of modified electrode structures that can modify (e.g., increase or decrease) the sensitivity and/or capacitive loading of the modified touch electrode cell are described below with reference to FIGS. 6-9.

Figure 6A:
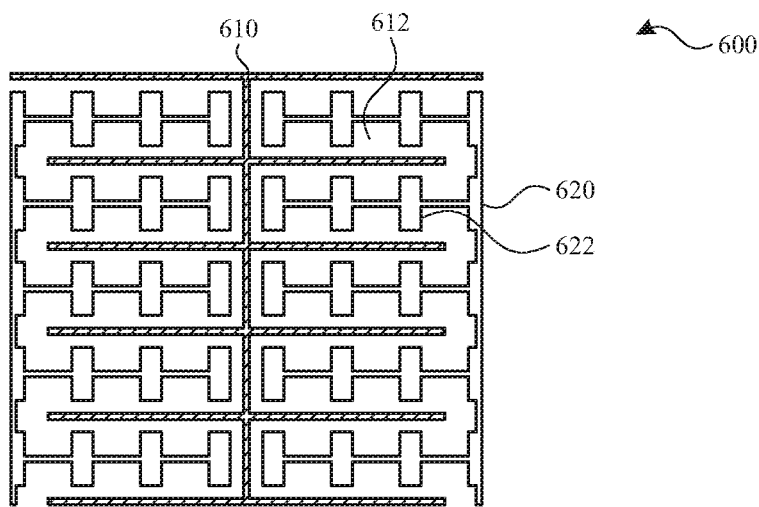
FIGS. 6A-6C illustrate exemplary touch electrode cells with various pattern densities according to some examples of the disclosure.
Figure 6B:
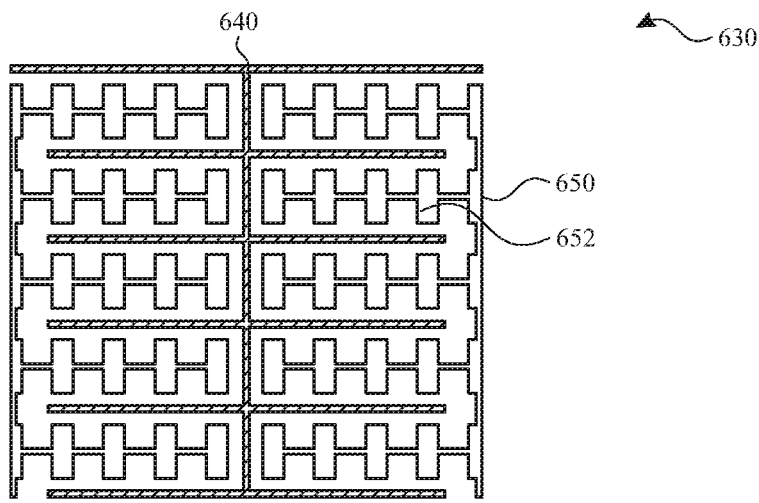
Figure 6C:
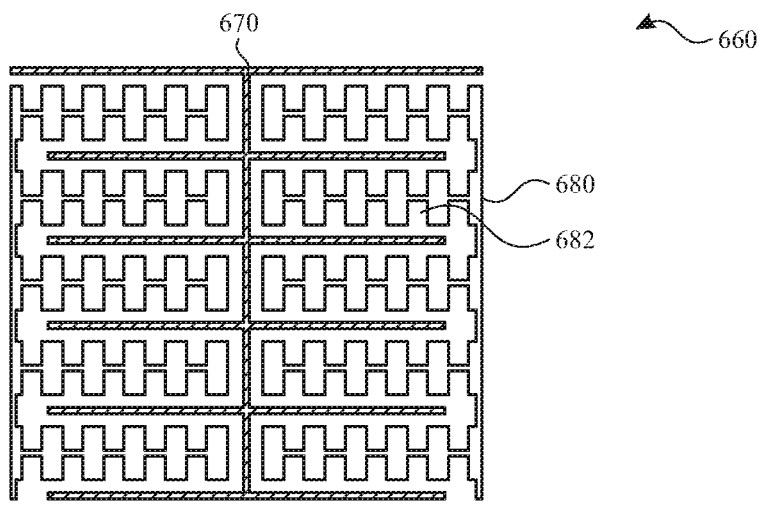

FIGS. 6A-6C illustrate exemplary touch electrode cells with various pattern densities according to some examples of the disclosure. FIG. 6A illustrates a first touch electrode cell 600 that can have a relatively low pattern density, FIG. 6B illustrates a second touch electrode cell 630 that can have a relatively moderate pattern density, and FIG. 6C illustrates a third touch electrode cell 660 that can have a relatively high pattern density.

As used herein "pattern density" is defined as the collective area of patterned conductive material included in the drive and sense lines (e.g., the row and column electrodes) per unit area. Touch electrode cells have "cell pattern densities" that convey the area of patterned conductive material (including conductive material of the row electrode and the column electrode included in the touch electrode cell) within the touch electrode cell per unit area of the respective touch electrode cell. In multi-layer touch panels, the "pattern density" depends on the total area of the patterned conductive material included in the row electrode on one material layer and the patterned conductive material included in the column electrode on another material layer per unit area of the touch electrode cell. Touch electrodes, such as row electrodes and column electrodes have "electrode pattern densities" that convey the area of conductive material (optionally across multiple touch electrode cells) per unit area of the respective touch electrode, the area of the respective touch electrode being defined as the area enclosed by the outer boundaries of the touch electrode.

As shown in FIG. 6A, the first touch electrode cell 600 can include a segment of a column electrode 610 and a segment of a row electrode 620. In some examples, the column electrode 610 and the row electrode 620 can include a conductive material, such as an opaque conductive material (e.g., silver, copper, etc.) or a fully, substantially, or partially transparent material (e.g., ITO, AZO, etc.).

Although not illustrated in FIG. 6A, in some examples, the segments of row electrode 620 can be connected in the direction of the row electrode. For example, conductive jumpers can be disposed on a layer of an electrode stackup that is different from the layer on which the column electrode 610 is disposed and can connect the segments (e.g., the left and right segments) of the row electrode 620 (e.g., using electrical vias or another connection). Thus, in some examples, the column electrode 610 and the row electrode 620 can be disposed on the same material layer of the electrode stackup. In some examples, the row electrode 620 and the column electrode 610 can be located on different material layers and the connection between segments of the row electrode 620 can be disposed on the same layer as the row electrode 620 itself.

In some examples, the row electrode 620 can be a drive electrode and the column electrode 610 can be a sense electrode. That is to say, a drive signal can be applied to the row electrode 620 and the electrical signal of the column electrode 610 can be sensed to determine the presence of a conductive object (e.g., a user's finger) at the intersection of the row electrode 620 and the column electrode 630 by determining the capacitive coupling between the row electrode 620 and the column electrode 630.

In some examples, the column electrode 610 and/or row electrode 620 can include a pattern of the conductive material. For example, the column electrode 610 can include extensions 612 disposed in a direction perpendicular to the column itself. As another example, the row electrode 620 can include a plurality of conductive "islands" 622 that are connected to one another. The conductive islands 622 can include a pattern of conductive material in any suitable shape, such as squares, rectangles, or circles. In some examples, other shapes are possible.

In some examples, the touch sensitivity and capacitive loading of the first touch electrode cell 600 can depend on the pattern density of the touch electrode cell 600 (e.g., how much area of the touch electrode cell is occupied by conductive patterns of the touch electrodes 610 and 620). Generally speaking, increasing the pattern density of the first touch electrode cell 600 can increase the touch sensitivity and the capacitive loading of the first touch electrode cell 600. In some examples, the sensitivity and capacitive loading of the column electrode 610 or the row electrode 620 can be modified by modifying the structure of these electrodes at one or more of the touch electrode cells the respective row or column occupies.

To illustrate this concept, it can be helpful to think of the proportion of the first touch electrode cell 600 that is occupied by the conductive pattern, including the column electrode 610 and the row electrode 620, as touch electrode density. As will be described herein, it is possible to modify the touch electrode density by changing the number of conductive islands 622 included in the touch electrode cell, for example. In some examples, the touch electrode density can be modified in other ways, such as by increasing the area of one or more of the touch electrodes 610 and 620, which can be done by increasing the area of the extensions 612 of the column electrode 610 or increasing the area of the conductive islands 622.

In some examples, touch electrode cell 600 can be disposed adjacent to one or more other touch electrode cells within a touch panel. That is to say, row electrode 620 can include segments in multiple touch electrode cells, such as continuing to the left or the right. One or more of the touch electrode cells that are adjacent to touch electrode cell can have pattern densities that are different from touch electrode cell 600. Thus, row electrode 620 can have a pattern density that varies by location within the touch panel. Likewise, in some examples, column electrode 610 can continue up or down from touch electrode cell 600 to be included in additional touch electrodes cells, and can have a different pattern density within those additional touch electrode cells, which can cause the column electrode 610 to have a varied pattern density.

As shown in FIG. 6B, the second touch electrode cell 630 can include a segment of a column electrode 640 and a segment of a row electrode 650 and, as shown in FIG. 6C, the third touch electrode cell 660 can include a segment of a column electrode 670 and a segment of a row electrode 680.

The first touch electrode cell 600, second touch electrode cell 630, and third touch electrode cell 660 can be substantially similar, except that the pattern densities of these touch electrode cells can differ. As shown in FIGS. 6A and 6B, the first touch electrode cell 600 can have fewer conductive islands 622 than the number of conductive islands 652 included in the second touch electrode cell 630. Likewise, as shown in FIGS. 6B and 6C, the second touch electrode cell 630 can have fewer conductive islands 652 than the number of conductive islands 682 included in the second touch electrode cell 660.

That is to say, the first touch electrode cell 600 can have a lower pattern density than the second touch electrode cell 630. Thus, the first touch electrode cell 600 (or the segment of row electrode 620 at a location of the first touch electrode cell 600) can have a lower touch sensitivity and/or lower capacitive loading than the second touch electrode cell 630 (or the segment of row electrode 650 at a location of the second touch electrode cell 630). Likewise, the second touch electrode cell 630 can have a lower pattern density than the third touch electrode cell 660. Thus, the second touch electrode cell 630 (or the row electrode 650 of the second touch electrode cell 630) can have a lower touch sensitivity and/or lower capacitive loading than the third touch electrode cell 630 (or the row electrode 680 of the third touch electrode cell 660).

As described above, in some examples, one or more touch electrode cells can be disposed adjacent to one another in an array of a touch panel. Touch electrode cells can be adjacent to one or more touch electrode cells having different pattern densities. Thus, in some examples, one or more touch electrodes included in the touch panel can have a pattern density that varies with respect to the location of the touch electrode within the touch panel, as will be described in more detail below with reference to FIG. 8.

In some examples, the pattern density of the touch electrode cells can be increased by increasing the number of extensions included in the portion of a column electrode included in the touch electrode cell. The number of rows of conductive islands included in the row electrode included in the touch electrode cells can also increase to fit in between the extensions of the column electrode. Modifying the row electrode in this way can change the pattern density of the row electrode, or the pattern density can remain the same depending on the number and area of the conductive islands included in the modified portion of the row electrode.

Figure 7A:
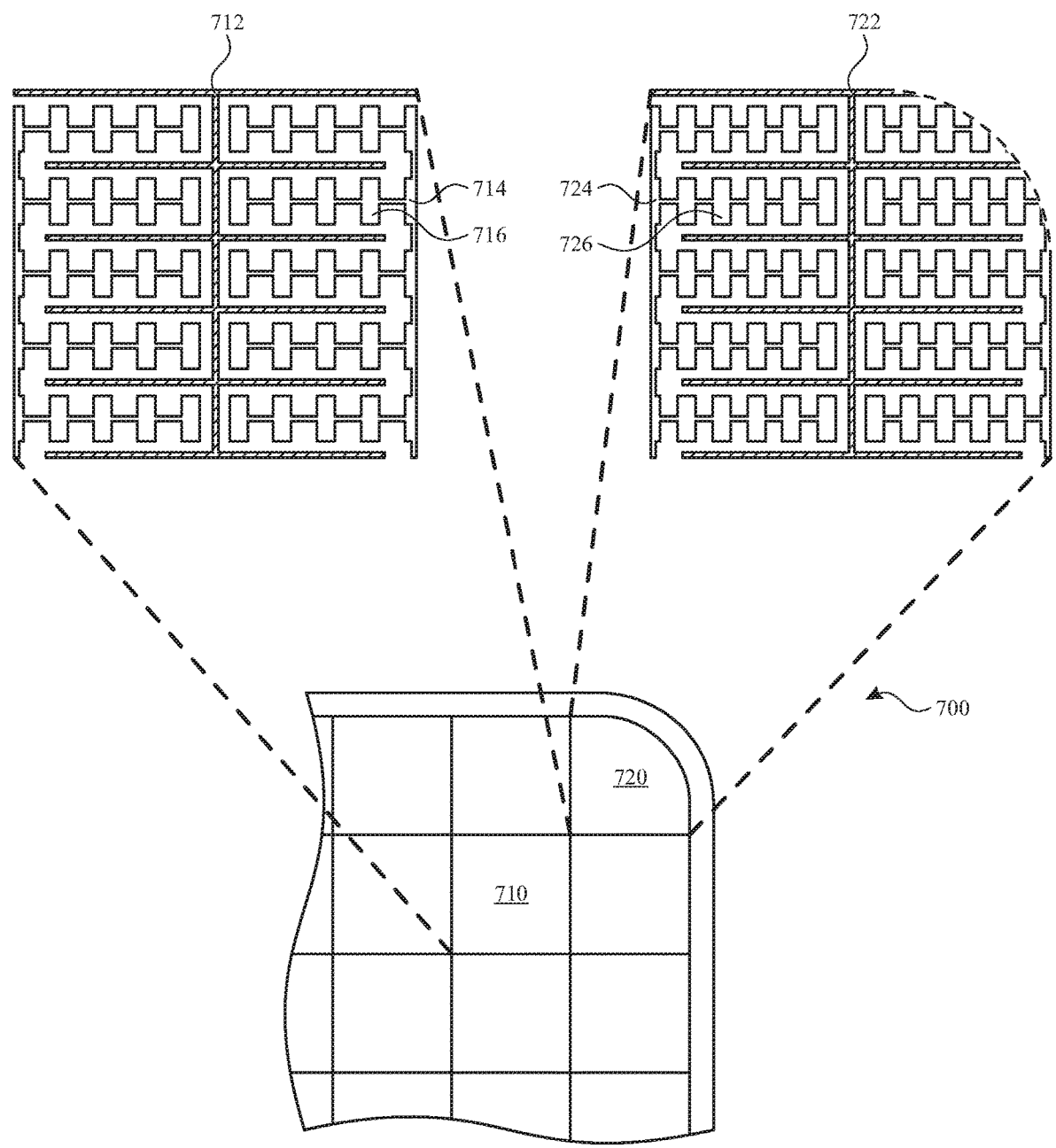
FIG. 7A illustrates an exemplary touch panel that includes rounded corners and modified touch electrode structures according to some examples of the disclosure.

FIG. 7A illustrates an exemplary touch panel 700 that includes rounded corners and modified touch electrode structures according to some examples of the disclosure. As shown in FIG. 7A, the touch panel 700 can include an inner touch electrode cell 710 and a corner touch electrode cell 720. As shown in FIG. 7A, the corner touch electrode cell 720 can have a smaller area than the inner touch electrode cell 710 to accommodate the rounded corner of the touch panel 700, for example.

As shown in FIG. 7A, the inner touch electrode cell 710 can be located in an interior region of the touch panel 700. That is to say, the inner touch electrode cell 710 is not located at the edge or corner of the touch panel 700, for example. In some examples, each respective touch electrode cell located in the interior region of the touch panel 700 can be adjacent to other touch electrode cells at all of the edges or sides of the respective touch electrode cell.

In some examples, the touch electrode cells 710 and 720 can be similar to the touch electrode cells 600, 630, and 660 described above with reference to FIGS. 6A-6C. The inner touch electrode cell 710 can include a segment of a column electrode 712 and a segment of a row electrode 714. The row electrode 714 can include a plurality of conductive islands 716. The corner touch electrode cell 720 can include a segment of a column electrode 722 and a segment of a row electrode 724. The row electrode 724 can include a plurality of conductive islands 726.

As shown in FIG. 7A, the corner touch electrode cell 720 can include a number of partial conductive islands 726 located at the rounded corner of the corner touch electrode cell 720. In some examples, some of the conductive islands 726 located at the rounded corner of the corner touch electrode cell 720 can be removed completely, such as in situations where one or more conductive islands would have an area below a predetermined area threshold if it were to be included as a partial conductive island. In some examples, conductive material can be disposed along the rounded corner of the corner touch electrode cell 720 to connect those portions of the row electrode 724 together. In some examples, conductive jumpers can join the left and right sides of the portion of the row electrode 724 together, allowing the portions of the row electrode at the rounded corner to be joined to the rest of the row electrode.

As shown in FIG. 7A, the corner touch electrode cell 720 can have a higher pattern density than the inner touch electrode cell 710 because the conductive islands 726 of the corner touch electrode cell 720 can be closer together than the conductive islands 716 of the inner touch electrode cell. In some examples, the corner touch electrode cell 720 can include more conductive islands 726 than the number of conductive islands 716 included in the inner touch electrode cell 710, though, due to the smaller overall area of the corner touch electrode cell 720, this may not be the case. In some examples, the corner touch electrode cell 720 has a greater number of conductive islands 716 per unit area of the corner touch electrode cell 720 than the number of conductive islands 716 per unit area of the inner touch electrode cell 710.

In some examples, the corner touch electrode cell 720 or the inner touch electrode cell 710 can be adjacent to one or more touch electrode cells that have different pattern densities than corner touch electrode cell 720 or inner touch electrode cell 710. Thus, one or more row electrodes included in corner touch electrode cell 720 or inner touch electrode cell 710 can have a pattern density that varies along the length of the row electrode.

If, instead of having different pattern densities, the corner touch electrode cell 720 and the inner touch electrode cell 710 had the same, substantially similar, or similar pattern density, the corner touch electrode cell 720 (or the row electrode 724 included in the corner touch electrode cell 720) could have a lower touch sensitivity and/or capacitive loading than the touch sensitivity and/or capacitive loading of the inner touch electrode cell 710 (or the row electrode 714 included in the inner touch electrode cell 710) because the corner touch electrode cell 720 can have a smaller area than the inner touch electrode cell 710, for example. In some examples, increasing the pattern density of the corner touch electrode cell 720 can reduce the difference between the touch sensitivity and/or capacitive loading of the corner touch electrode cell 720 (or row electrode 724) and the inner touch electrode cell 710 (or row electrode 714).

Thus, the touch sensitivity and/or capacitive loading of the corner touch electrode cell 720 (or row electrode 724) can be increased by increasing the density of conductive islands 726 within the corner touch electrode cell 720, thereby compensating for the relatively smaller area of the corner touch electrode cell 720 compared to the inner touch electrode cell 710. The pattern density of a respective touch electrode cell can be increased in situations other than at the corner of a touch panel with rounded corners, as will be described below with reference to FIGS. 7B-7D.

Figure 7B:
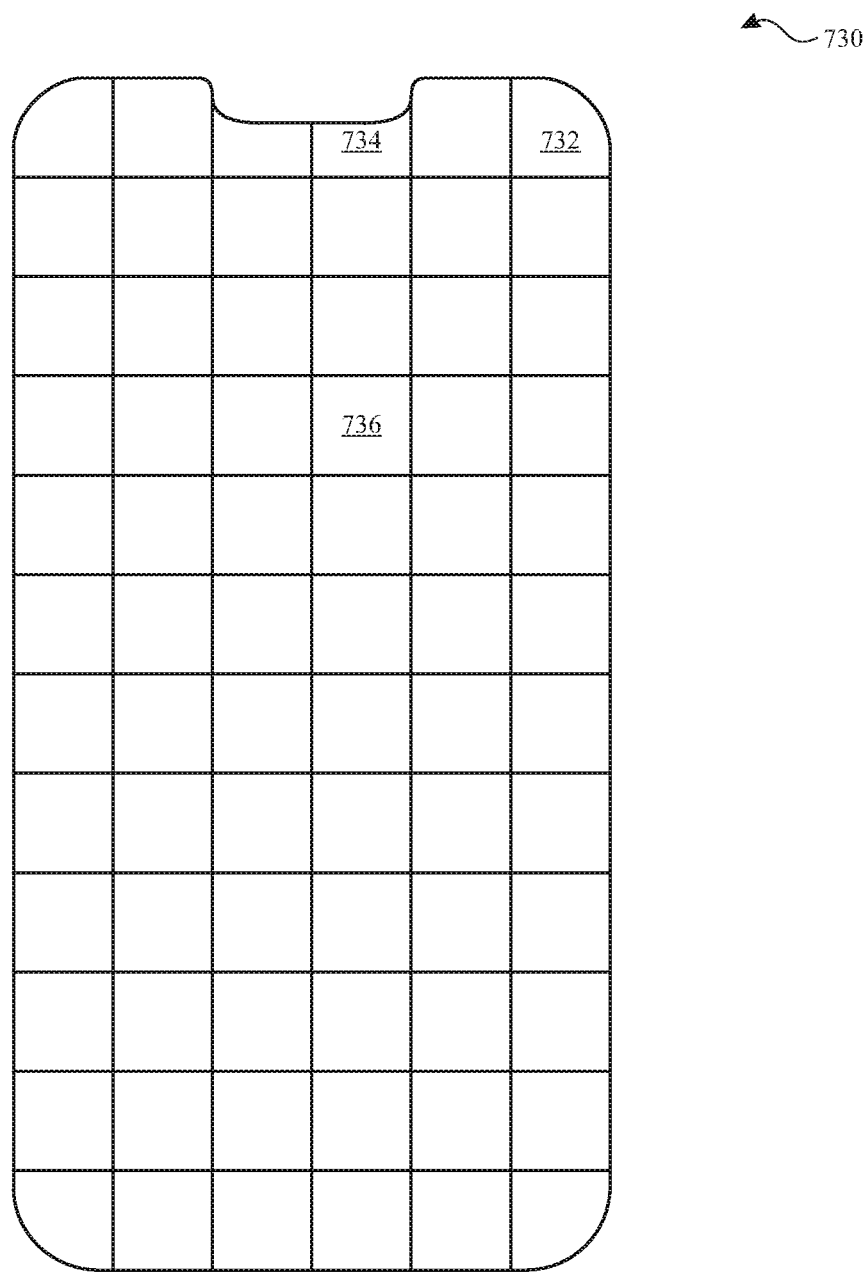
FIG. 7B illustrates an exemplary touch panel with rounded corners and a notch 738 that includes modified electrode structures according to some examples of the disclosure.

FIG. 7B illustrates an exemplary touch panel 730 with rounded corners and a notch 738 that includes modified electrode structures according to some examples of the disclosure. In some examples, the touch panel 740 can include a notch 738 that accommodates one or more components of an electronic device, such as a camera and/or a light sensor. Touch panel 730 can include an array of touch electrode cells, including corner touch electrode cell 732, notch touch electrode cell 734, and inner touch electrode cell 736. Although the details of the touch electrode cells 732, 734, and 736 are not illustrated in FIG. 7B, it should be understood that the touch electrode cells 732, 734, and 736 can include patterned touch electrodes, such as segments of row electrodes and column electrodes. That is to say, the touch electrode cells 732, 734, and 736 can be similar to the touch electrode cells illustrated in FIGS. 6A-6C above.

In some examples, the inner touch electrode cell 736 of the touch panel 730 can have a larger area than the corner touch electrode cell 732 or the notch touch electrode cell 734. If the touch electrode cells 732, 734, and 736 were to have the same, substantially similar, or similar pattern densities, the notch touch electrode cell 734 and the corner touch electrode cell 732 (or one or more row or column electrodes included in these touch electrode cells) could have a lower touch sensitivity and/or a lower capacitive loading than the touch sensitivity and/or capacitive loading of the inner touch electrode cell 736 (or one or more row or column electrodes included in the inner touch electrode cell).

To reduce the variation in touch sensitivity and capacitive loading across multiple locations at the touch panel, the pattern densities of one or more of the touch electrode cells and/or one or more row electrodes of the touch panel 730 can be modified. For example, the corner touch electrode cell 732 and/or the notch touch electrode cell 734 can have higher pattern densities than the pattern density of the inner touch electrode cell 736. Likewise, a row electrode that is included in the notch touch electrode cell 734 and/or the corner 732 touch electrode cell can have increased pattern density at the location(s) of the notch and/or corner compared to other portions of the row electrode. In some examples, more than two pattern densities can be used. For example, the inner touch electrode cell 736 can have a first pattern density, the corner touch electrode cell 732 can have a second pattern density that can be greater than the first pattern density, and the notch touch electrode cell 734 can have a third pattern density that is greater than the second pattern density. The pattern densities can be selected, for example, based on the area of the respective touch electrode cells. For example, because the inner touch electrode cell 736 can have the highest area, it can have the lowest pattern density. Likewise, for example, if the notch touch electrode cell 734 has the lowest area, it can have the highest pattern density.

Figure 7C:
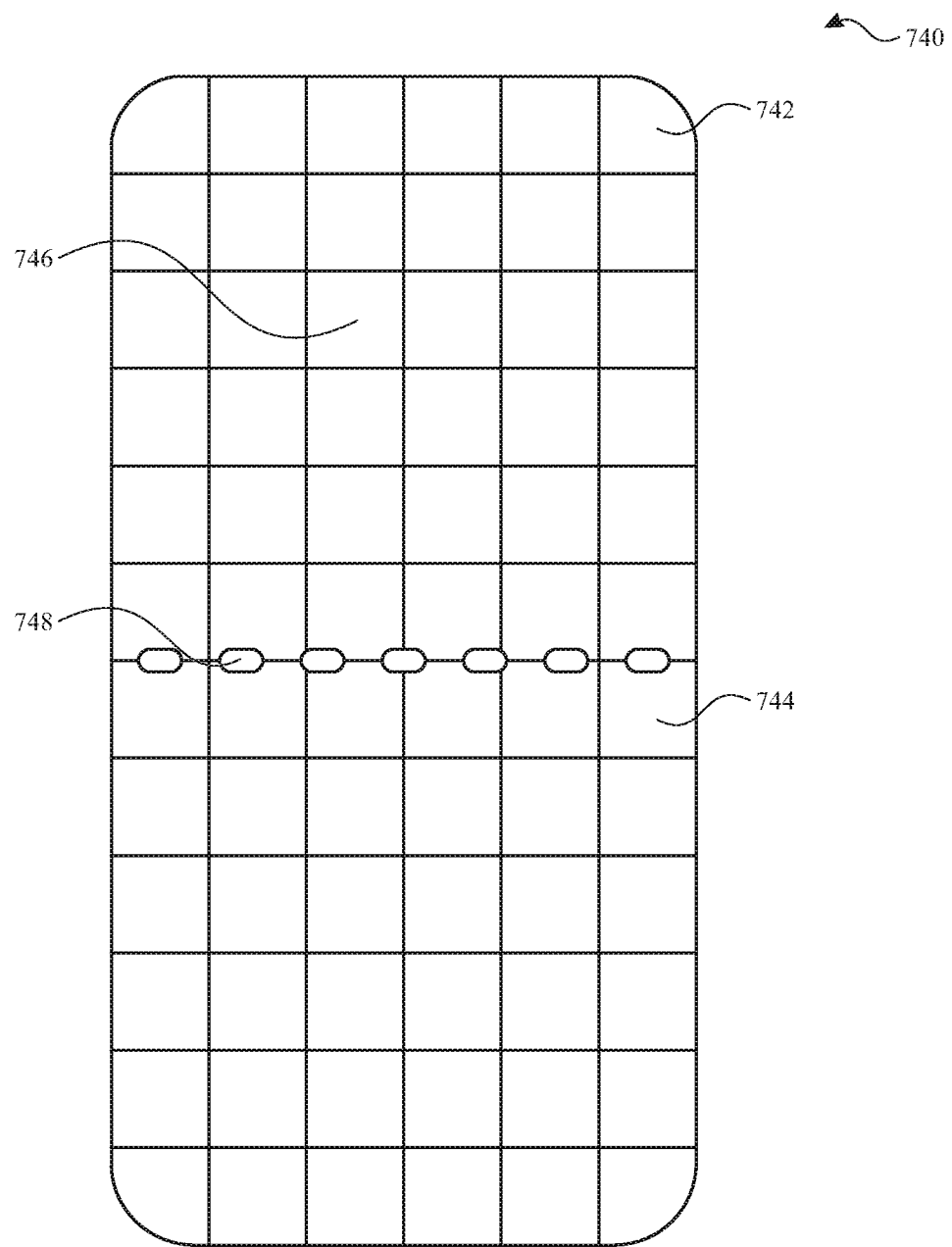
FIG. 7C illustrates an exemplary touch panel with rounded corners and perforation 748 that includes modified electrode structures according to some examples of the disclosure.

FIG. 7C illustrates an exemplary touch panel 740 with rounded corners and perforation 748 that includes modified electrode structures according to some examples of the disclosure. Touch panel 740 can include perforation 748 that can allow the touch panel to be folded. Touch panel 740 can include an array of touch electrode cells, including corner touch electrode cell 742, perforation touch electrode cell 744, and inner touch electrode cell 744. Although the details of the touch electrode cells 742, 744, and 746 are not illustrated in FIG. 7C, it should be understood that the touch electrode cells 742, 744, and 746 can include patterned touch electrodes, such as segments of row electrodes and column electrodes. That is to say, the touch electrode cells 742, 744, and 746 can be similar to the touch electrode cells illustrated in FIGS. 6A-6C above.

In some examples, the inner touch electrode cell 746 of the touch panel 740 can have a larger area than the corner touch electrode cell 742 or the perforation touch electrode cell 744. If the touch electrode cells 742, 744, and 746 were to have the same, substantially similar, or similar pattern densities, the perforation touch electrode cell 744 and the corner touch electrode cell 742 (or one or more row or column electrodes included in these touch electrode cells) could have a lower touch sensitivity and/or a lower capacitive loading than the touch sensitivity and/or capacitive loading of the inner touch electrode cell 746 (or one or more row or column electrodes included in the inner touch electrode cell).

To reduce the variation in touch sensitivity and capacitive loading across multiple locations at the touch panel, the pattern densities of one or more of the touch electrode cells and/or one or more row electrodes of the touch panel 740 can be modified. For example, the corner touch electrode cell 742 and/or the perforation touch electrode cell 744 can have higher pattern densities than the pattern density of the inner touch electrode cell 746. Likewise, one or more row electrodes included in corner touch electrode cell 742 and/or perforation touch electrode cell 744 can have increased pattern density at the location(s) of the corner or perforation compared to other portions of the row electrode. In some examples, more than two pattern densities can be used. For example, the inner touch electrode cell 746 can have a first pattern density, the perforation touch electrode cell 744 can have a second pattern density that can be greater than the first pattern density, and the corner touch electrode cell 742 can have a third pattern density that is greater than the second pattern density. The pattern densities can be selected, for example, based on the area of the respective touch electrode cells. For example, because the inner touch electrode cell 746 can have the highest area, it can have the lowest pattern density. Likewise, for example, if the corner touch electrode cell 742 has the lowest area, it can have the highest pattern density.

Figure 7D:
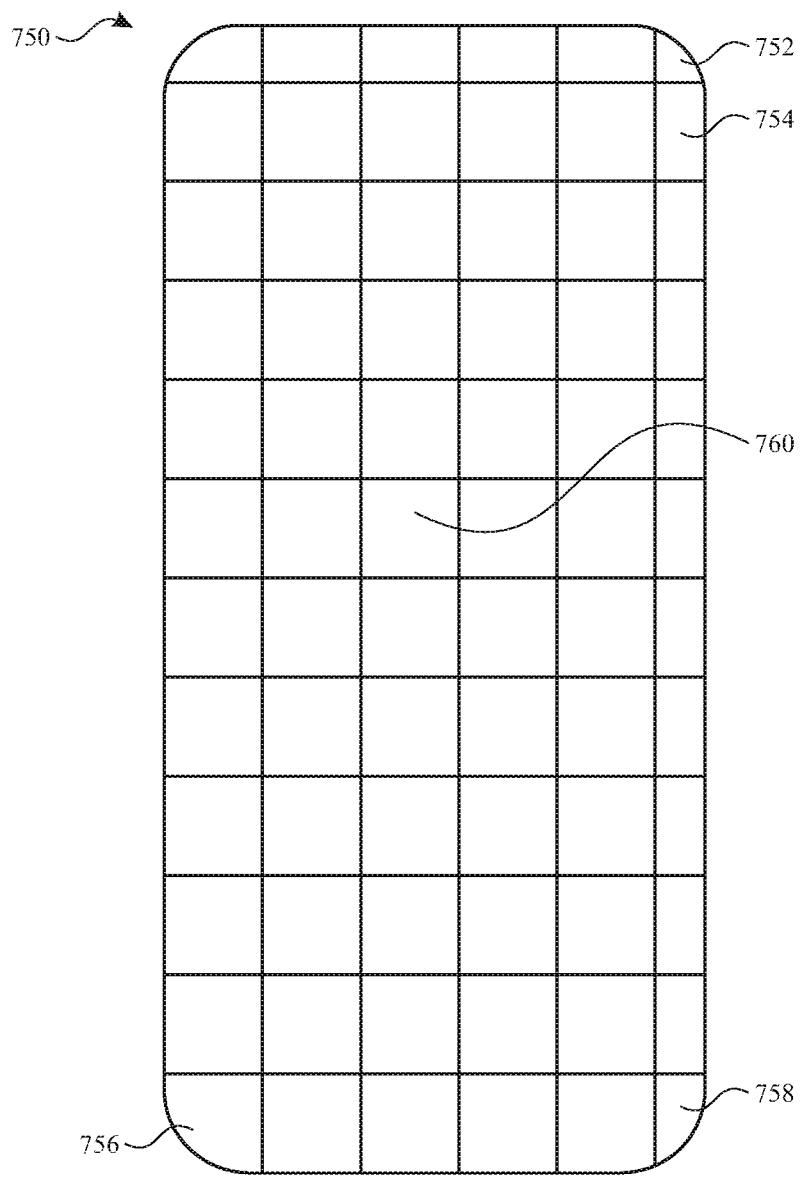
FIG. 7D illustrates an exemplary touch panel with rounded corners that includes modified electrode structures at its corners and edges according to some examples of the disclosure.

FIG. 7D illustrates an exemplary touch panel 750 with rounded corners that includes modified electrode structures at its corners and edges according to some examples of the disclosure. Touch panel 750 can include edge touch cells 754 that can have a smaller area than the inner touch cells 760. Touch panel 750 can include an array of touch electrode cells, including a first corner touch electrode cell 752, second corner touch electrode cell 758, third touch electrode cell 756, edge touch electrode cell 754, and inner touch electrode cell 760. Although the details of the touch electrode cells 752, 754, 756, 758, and 760 are not illustrated in FIG. 7D, it should be understood that the touch electrode cells 752, 754, 756, 758, and 760 can include patterned touch electrodes, such as segments of row electrodes and column electrodes. That is to say, the touch electrode cells 752, 754, 756, 758, and 760 can be similar to the touch electrode cells illustrated in FIGS. 6A-6C above.

In some examples, the inner touch electrode cell 760 of the touch panel 750 can have a larger area than the corner touch electrode cells 752, 756 and 758 or the edge touch electrode cell 754. If the touch electrode cells 752, 754, 756, 758, and 760 were to have the same, substantially similar, or similar pattern densities, the touch sensitivity and/or a capacitive loading among the touch electrode cells 752, 754, 756, 758, and 760 (or among row electrodes of the touch electrode cells) could vary. If, as in some examples, the first corner touch electrode cell 752, the second corner touch electrode cell 758, the third corner touch electrode cell 756, the edge touch electrode cell 754, and the inner touch electrode cell 760 each have different areas, then the touch sensitivity and/or capacitive loading of the se touch electrode cells (or of the row electrodes in the touch electrode cells) could be different from one another. In some examples, a touch panel can include touch electrode cells and/or row electrodes with increased pattern density at the edge of the touch panel, even if the area of the edge touch electrode cells is equal to the area of the inner touch electrode cells (e.g., inner touch electrode cell 760).

To reduce the variation in touch sensitivity and capacitive loading across multiple locations at the touch panel, the pattern densities of one or more of the touch electrode cells and/or one or more row electrodes of the touch panel 750 can be modified. For example, the first corner touch electrode cell 752, the second corner touch electrode cell 758, the third corner touch electrode cell 756, and the edge touch electrode cell 754 can have higher pattern densities than the pattern density of the inner touch electrode cell 760. Likewise, a row electrode that is included in one or more of touch electrode cells 752, 754, 756, and 758 can have increased pattern density at the location(s) of the corners or edges of the touch panel. In some examples, multiple pattern densities can be used. For example, the inner touch electrode cell 760 can have a first pattern density, the third corner touch electrode cell 756 can have a second pattern density that can be greater than the first pattern density, and the edge touch electrode cell 754 can have a third pattern density that is greater than the second pattern density. In some examples, moreover, the second corner touch electrode cell 758 can have a fourth pattern density that is greater than the third pattern density and the first corner touch electrode cell 752 can have a fifth pattern density that is greater than the fourth pattern density. The pattern densities can be selected, for example, based on the area of the respective touch electrode cells. For example, because the inner touch electrode cell 760 can have the highest area, it can have the lowest pattern density. Likewise, for example, if the first corner touch electrode cell 752 has the lowest area, it can have the highest pattern density.

Figure 8:
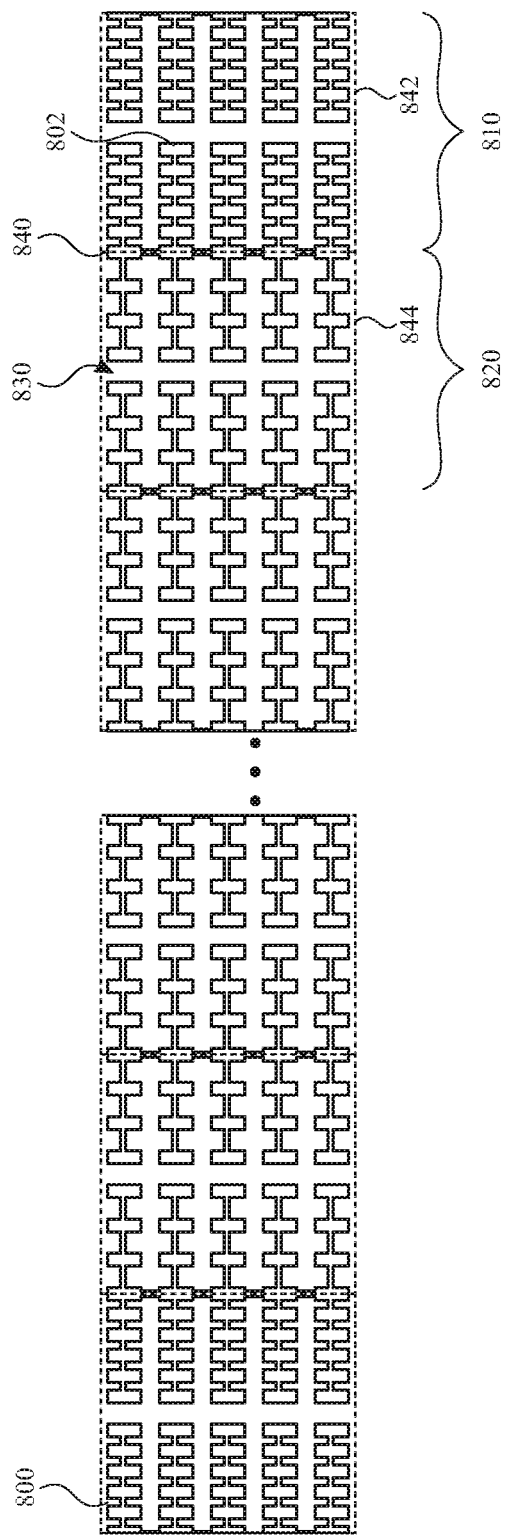
FIG. 8 illustrates an exemplary touch electrode that can be incorporated into a touch panel according to some examples of the disclosure.

FIG. 8 illustrates an exemplary touch electrode 800 that can be incorporated into a touch panel according to some examples of the disclosure. As an example, touch electrode 800 can be a row electrode similar to any of the row electrodes described above with reference to FIGS. 5-7. As shown in FIG. 8, touch electrode 800 can include a pattern of conductive material that includes a plurality of connected conductive islands 802.

In some examples, touch electrode 800 can have a pattern density that varies along the length of the touch electrode. For example, the touch electrode 800 can include one or more high-density segments 810 in which the touch electrode 800 has a pattern density that is higher than the pattern density at one or more other locations of the touch electrode. Likewise, the touch electrode 800 can include one or more low-density segments 820 in which the touch electrode 800 has a pattern density that is lower than the pattern density at one or more other locations of the touch electrode. That is to say, the number of conductive islands 802 per unit area of the touch electrode 800 is higher in the high-density segment 810 than it is in the low-density segment 820.

Touch electrode 800 can include a plurality of patterned electrodes separated by gaps 830, for example. In some examples, one or more column electrodes can be disposed in the gaps 830 in a manner similar to the column electrodes 610, 640, and 670 illustrated in FIGS. 6A-6C, for example. Although not shown in FIG. 8, in some examples, the patterned electrodes can be connected by a conductive material such as jumpers, vias, traces, and the like.

In some examples, touch electrode 800 is included in a plurality of touch electrode cells similar to any of the touch electrode cells described above with reference to FIGS. 5-7. The boundaries 840 between touch electrode cells illustrate how the row electrode 800 is included in multiple touch electrode cells. For example, the footprints of touch electrode cells 842, and 844 are illustrated to show how these touch electrode cells include parts of the touch electrode 800. Touch electrode cell 842 can include the high-density segment 810 of the touch electrode 800 and touch electrode cell 844 can include the low-density segment 820 of the touch electrode 800. Thus, the pattern density of the touch electrode 800 varies along the length of the touch electrode.

Figure 9:
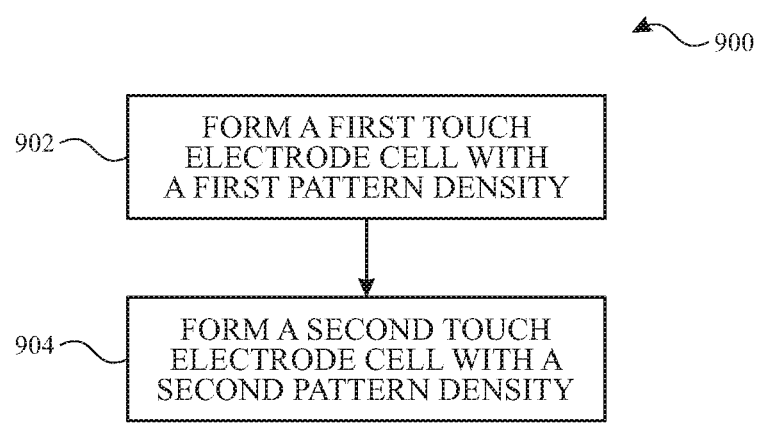
FIG. 9 illustrates an exemplary process for manufacturing a touch panel with modified electrode structures according to some examples of the disclosure.

FIG. 9 illustrates an exemplary process 900 for manufacturing a touch panel with modified electrode structures according to some examples of the disclosure. Process 900 can be used to manufacture a touch panel such as one or more of the touch panels described above with reference to FIGS. 5-8.

In step 902 of process 900, a first touch electrode cell can be formed with a first pattern density. Forming the first touch electrode cell can include depositing touch electrodes in rows and/or columns, for example. In some examples, the touch electrode cell is formed in a pattern illustrated in FIGS. 6A-6C. For example, the touch electrode cell can include a portion of a row electrode and a portion of a column electrode. In some examples, one of the row or the column electrodes can include a plurality of connected conductive islands (e.g., conductive islands 622, 652, or 682). The number of conductive islands per unit area of the first touch electrode cell can be selected based on a desired pattern density of the first touch electrode cell. In some examples, the pattern density of the first touch electrode cell can be selected based on the area of first touch electrode cell compared to the areas of the other touch electrode cells included in the touch panel.

In step 904 of process 900, a second touch electrode cell can be formed with a second pattern density. The second touch electrode cell can be formed in a manner similar to the forming of the first touch electrode cell. In some examples, the second touch electrode cell can have a second pattern density that is different from the first pattern density. The second touch electrode cell can have a different area than the first touch electrode cell, for example. In some examples, selecting different pattern densities for the first and second touch electrode cells can reduce the difference in touch sensitivity and/or capacitive loading of the touch electrode cells (or of the row electrodes included in the first and second touch electrode cells).

Therefore, according to the above, some examples of the disclosure are directed to an electronic device, comprising a touch panel, the touch panel comprising a plurality of touch electrode cells including a first touch electrode cell having a first cell pattern density determined by an area of patterned conductive material of the first touch electrode cell and an area of the first touch electrode cell; and a second touch electrode cell having a second cell pattern density, different than the first pattern density determined by an area of patterned conductive material of the second electrode cell and an area of the second touch electrode cell. Additionally or alternatively, in some examples the touch panel includes a plurality of first electrodes disposed along a first direction and a plurality of second electrodes disposed along a second direction that is perpendicular to the first direction, a first electrode of the plurality of first electrodes has a portion included in the first touch electrode cell, the first electrode has a first electrode pattern density at a location of the first touch electrode cell, a second electrode of the plurality of first electrodes has a portion included in the second touch electrode cell, the second electrode has a second electrode pattern density at a location of the second touch electrode cell, the second electrode pattern density different than the first electrode pattern density, a third electrode of the plurality of second electrodes has a portion included in the first touch cell, the third electrode has a third electrode pattern density at a location in the first touch electrode cell, a fourth electrode of the plurality of second electrodes has a portion included in the second touch cell, and the fourth electrode has the third electrode pattern density at a location in the second touch electrode cell. Additionally or alternatively, in some examples the plurality of first electrodes are drive lines and the plurality of second electrodes are sense lines. Additionally or alternatively, in some examples the patterned conductive material of the first touch electrode cell comprises a first plurality of conductive islands, the first touch electrode cell having a first number of conductive islands per unit area of the first touch electrode cell, and the patterned conductive material of the second touch electrode cell comprises a second plurality of conductive islands, the second touch electrode cell having a second number of conductive islands per unit area of the second touch electrode cell. Additionally or alternatively, in some examples the first touch electrode cell is located at a corner of the touch panel, the first touch electrode cell has a first area, the second touch electrode cell is located in an interior region of the touch panel, the second touch electrode cell has a second area that is greater than the first area, and the second pattern density is less than the first pattern density. Additionally or alternatively, in some examples the first touch electrode cell includes a curved edge located at the corner of the touch panel, and the first touch electrode cell includes a curved conductive trace at the curved edge of the first touch electrode cell, the curved conductive trace coupling a plurality of patterns of conductive material included in the first touch electrode cell. Additionally or alternatively, in some examples the first touch electrode cell is located at an edge of the touch panel, the first touch electrode cell has a first area, the second touch electrode cell is located in an interior region of the touch panel, the second touch electrode cell has a second area that is greater than the first area, and the second pattern density is less than the first pattern density. Additionally or alternatively, in some examples the touch panel comprises one or more of a notch or a perforation, the first touch electrode cell is in contact with the notch or the perforation of the touch panel, the first touch electrode cell has a first area, the second touch electrode cell is located in an interior region of the touch panel, the second touch electrode cell has a second area that is greater than the first area, and the second pattern density is less than the first pattern density. Additionally or alternatively, in some examples the touch panel further comprises a third touch electrode cell, the third touch electrode cell including the conductive material in a third pattern, the third touch electrode cell having a third pattern density that is calculated with an area of the conductive material in the third pattern and an area of the third touch electrode cell, and the third pattern density is different from the first pattern density and the second pattern density. Additionally or alternatively, in some examples the first touch electrode cell is located at a corner of the touch panel, the second touch electrode cell is located at an edge of the touch panel, the third touch electrode cell is located in an interior region of the touch panel, the first pattern density is greater than the second pattern density, and the second pattern density is greater than the third pattern density.

In some examples, an electronic device comprises a touch panel, the touch panel comprising a plurality of first touch electrodes disposed along a first direction and a plurality of second touch electrodes disposed along a second direction that is perpendicular to the first direction, wherein: one or more of the plurality of first touch electrodes has a first electrode pattern density at a first location of the touch panel and a second electrode pattern density at a second location of the touch panel, the second electrode pattern density different from the first electrode pattern density. Additionally or alternatively, in some examples each of the plurality of first touch electrodes comprises a plurality of patterned electrodes connected by conductive traces along the first direction. Additionally or alternatively, in some examples the plurality of first touch electrodes are drive lines and the plurality of second touch electrodes are sense lines. Additionally or alternatively, in some examples each of the plurality of first touch electrodes and each of the plurality of second touch electrodes comprise a patterned conductive material, the patterned conductive material of a respective first touch electrode comprises a first plurality of conductive islands per unit area of the respective first touch electrode at the first location of the touch panel, and the patterned conductive material of the respective first touch electrode comprises a second plurality of conductive islands per unit area of the respective touch electrode at the second location of the touch panel. Additionally or alternatively, in some examples the first location of the touch panel is located at a corner of the touch panel, the second location of the touch panel is located in an interior region of the touch panel, and the second electrode pattern density is less than the first electrode pattern density. Additionally or alternatively, in some examples a respective first touch electrode includes a curved edge located at the corner of the touch panel, and the respective first touch electrode includes a curved conductive trace at the curved edge of the respective first touch electrode, the curved conductive trace coupling a plurality of patterns of conductive material included in the respective first touch electrode. Additionally or alternatively, in some examples the first location of the touch panel is located at an edge of the touch panel, the second location of the touch panel is located in an interior region of the touch panel, and the second electrode pattern density is less than the first electrode pattern density. Additionally or alternatively, in some examples the touch panel comprises one or more of a notch or a perforation, the first location of the touch panel is in contact with the notch or the perforation of the touch panel, the second location of the touch panel is located in an interior region of the touch panel, and the second electrode pattern density is less than the first electrode pattern density.

In some examples, a method of forming a touch panel comprises forming a first touch electrode cell, the first touch electrode cell including a patterned conductive material in a first pattern, the first touch electrode cell having a first pattern density that is calculated with an area of the patterned conductive material in the first pattern and an area of the first touch electrode cell; and forming a second touch electrode cell, the second touch electrode cell including the patterned conductive material in a second pattern, the second touch electrode cell having a second pattern density that is calculated with an area of the patterned conductive material in the second pattern and an area of the second touch electrode cell, wherein the first pattern density is different from the second pattern density. Additionally or alternatively, in some examples forming the first touch electrode cell includes forming a first touch electrode and a second touch electrode, the first touch electrode disposed along a first direction and the second touch electrode disposed along a second direction, the second direction perpendicular to the first direction, the first touch electrode cell including a portion of the first touch electrode and a portion of the second touch electrode, forming the second touch electrode cell includes forming a third touch electrode and a fourth touch electrode, the third touch electrode disposed along the first direction and the fourth touch electrode disposed along the second direction, the second touch electrode cell including a portion of the first touch electrode and a portion of the fourth touch electrode, the first touch electrode has a first electrode pattern density at a location of the first touch electrode cell, the third touch electrode has a second electrode pattern density at a location of the second touch electrode cell, the second electrode pattern density different than the first electrode pattern density, the second touch electrode has a third electrode pattern density at a location of the first touch electrode cell, and the fourth touch electrode has the third electrode pattern density at a location of the second touch electrode cell. Additionally or alternatively, in some examples the patterned conductive material of the first touch electrode cell comprises a first plurality of conductive islands, the first touch electrode cell having a first number of conductive islands per unit area of the first touch electrode cell, and the patterned conductive material of the second touch electrode cell comprises a second plurality of conductive islands, the second touch electrode cell having a second number of conductive islands per unit area of the second touch electrode cell.

Although the disclosed examples have been fully described with reference to the accompanying drawings, it is to be noted that various changes and modifications will become apparent to those skilled in the art. Such changes and modifications are to be understood as being included within the scope of the disclosed examples as defined by the appended claims.

What is claimed is:

1. An electronic device, comprising:
a touch panel comprising a first plurality of touch electrodes and a second plurality of touch electrodes, the touch panel comprising a plurality of touch electrode cells including:
a first touch electrode cell having a first area and including a first portion of a first touch electrode of the first plurality of touch electrodes, wherein the first portion of the first touch electrode has a first electrode pattern density and comprises a patterned conductive material including a first plurality of connected conductive islands, the first touch electrode cell having a first number of connected conductive islands per unit area of the first touch electrode cell; and
a second touch electrode cell having a second area, larger than the first area, and including a second portion of the first touch electrode, wherein the second portion of the first touch electrode has a second electrode pattern density, less than the first electrode pattern density, and comprises a patterned conductive material including a second plurality of connected conductive islands, the second touch electrode cell having a second number of connected conductive islands per unit area of the second touch electrode cell, different from the first number of connected islands per unit.

2. The electronic device of claim 1, wherein:
the first plurality of touch electrodes are disposed along a first direction and the second plurality of touch electrodes are disposed along a second direction that is perpendicular to the first direction.

3. The electronic device of claim 2, wherein:
the first plurality of touch electrodes are drive lines and the second plurality of touch electrodes are sense lines.

4. The electronic device of claim 1, wherein:
the first touch electrode cell is located at a corner of the touch panel, and
the second touch electrode cell is located in an interior region of the touch panel.

5. The electronic device of claim 4, wherein:
the first touch electrode cell includes a curved edge located at the corner of the touch panel, and
the first touch electrode cell includes a curved conductive trace at the curved edge of the first touch electrode cell, the curved conductive trace coupling a plurality of segments of patterned conductive material included in the first touch electrode cell.

6. The electronic device of claim 1, wherein:
the first touch electrode cell is located at an edge of the touch panel, and
the second touch electrode cell is located in an interior region of the touch panel.

7. The electronic device of claim 1, wherein:
the touch panel comprises one or more of a notch or a perforation,
the first touch electrode cell is in contact with the notch or the perforation of the touch panel, and the second touch electrode cell is located in an interior region of the touch panel.

8. The electronic device of claim 1, wherein:
the first touch electrode cell includes a first touch electrode of the second plurality of touch electrodes,
the second touch electrode cell includes a second touch electrode of the second plurality of touch electrodes, and
the first touch electrode of the second plurality of touch electrodes and the second touch electrode of the second plurality of touch electrodes has a third electrode pattern density in the first touch electrode cell and in the second touch electrode cell.

9. An electronic device comprising:
a touch panel, the touch panel comprising a plurality of touch electrode cells including:
a first touch electrode cell having a first cell pattern density determined by an area of patterned conductive material of the first touch electrode cell and an area of the first touch electrode cell;
a second touch electrode cell having a second cell pattern density, different than the first cell pattern density, determined by an area of patterned conductive material of the second electrode cell and an area of the second touch electrode cell; and
a third touch electrode cell having a third cell pattern density determined by an area of patterned conductive material of the third touch electrode cell and an area of the third touch electrode cell, the third cell pattern density different from the first cell pattern density and the second cell pattern density;
wherein:
the patterned conductive material of the first touch electrode cell comprises a first plurality of connected conductive islands, the first touch electrode cell having a first number of connected conductive islands per unit area of the first touch electrode cell, and
the patterned conductive material of the second touch electrode cell comprises a second plurality of connected conductive islands, the second touch electrode cell having a second number of connected conductive islands per unit area of the second touch electrode cell, different from the first number of connected conductive islands per unit.

10. The electronic device of claim 9, wherein:
the first touch electrode cell is located at a corner of the touch panel,
the second touch electrode cell is located at an edge of the touch panel,
the third touch electrode cell is located in an interior region of the touch panel,
the first cell pattern density is greater than the second cell pattern density, and
the second cell pattern density is greater than the third cell pattern density.

11. The electronic device of claim 9, wherein:
the patterned conductive material of the third touch electrode cell comprises a third plurality of conductive islands, the second touch electrode cell having a third number of conductive islands per unit area of the third touch electrode cell, different from the first number of conductive islands per unit area and from the first number of conductive islands per unit area.

12. The electronic device of claim 9, wherein:
the first touch electrode cell is located at a corner of the touch panel;
the first touch electrode cell includes a curved edge located at the corner of the touch panel, and
the first touch electrode cell includes a curved conductive trace at the curved edge of the first touch electrode cell, the curved conductive trace coupling a plurality of segments of patterned conductive material included in the first touch electrode cell.

13. An electronic device, comprising:
a touch panel, the touch panel comprising a plurality of first touch electrodes disposed along a first direction and a plurality of second touch electrodes disposed along a second direction that is perpendicular to the first direction, wherein:
a respective touch electrode of the plurality of first touch electrodes has a first electrode pattern density at a first location of the touch panel and a second electrode pattern density at a second location of the touch panel, the second electrode pattern density different from the first electrode pattern density,
each of the plurality of first touch electrodes and each of the plurality of second touch electrodes comprises a patterned conductive material,
the patterned conductive material of the respective touch electrode comprises a first plurality of connected conductive islands per unit area of the respective touch electrode at the first location of the touch panel,
the patterned conductive material of the respective touch electrode comprises a second plurality of connected conductive islands per unit area of the respective touch electrode at the second location of the touch panel, and
a number of the first plurality of connected conductive islands per unit area is different from the second plurality of connected conductive islands per unit area.

14. The electronic device of claim 13, wherein each of the plurality of first touch electrodes comprises a plurality of patterned electrodes connected by conductive traces along the first direction.

15. The electronic device of claim 13, wherein:
the plurality of first touch electrodes are drive lines and the plurality of second touch electrodes are sense lines.

16. The electronic device of claim 13, wherein:
the first location of the touch panel is located at a corner of the touch panel,
the second location of the touch panel is located in an interior region of the touch panel, and
the second electrode pattern density is less than the first electrode pattern density.

17. The electronic device of claim 16, wherein:
the respective touch electrode includes a curved edge located at the corner of the touch panel, and
the respective touch electrode includes a curved conductive trace at the curved edge of the respective touch electrode, the curved conductive trace coupling a plurality of segments of patterned conductive material included in the respective touch electrode.

18. The electronic device of claim 13, wherein:
the first location of the touch panel is located at an edge of the touch panel,
the second location of the touch panel is located in an interior region of the touch panel, and
the second electrode pattern density is less than the first electrode pattern density.

19. The electronic device of claim 13, wherein:
the touch panel comprises one or more of a notch or a perforation,
the first location of the touch panel is in contact with the notch or the perforation of the touch panel,
the second location of the touch panel is located in an interior region of the touch panel, and
the second electrode pattern density is less than the first electrode pattern density.

* * * * *